United States Patent [19]

Jack

[11] Patent Number: 4,948,080
[45] Date of Patent: Aug. 14, 1990

[54] BICYCLE DRINK HOLDER

[76] Inventor: Stephen W. Jack, 4818 Orchard Ave., San Diego, Calif. 92107

[21] Appl. No.: 230,906

[22] Filed: Aug. 11, 1988

[51] Int. Cl.⁵ .............................................. B62J 11/00
[52] U.S. Cl. ................................................. 248/311.2
[58] Field of Search ............... 248/102, 103, 105, 106, 248/149, 150, 154, 214, 229, 230, 231, 231.6, 309.1, 310, 311.2, 313, 316.1, 316.4, 316.6, 346, 500; 224/42, 45 R, 30 A, 39, 41

[56] References Cited

U.S. PATENT DOCUMENTS

| | | | |
|---|---|---|---|
| 746,956 | 12/1903 | Grantham | 248/310 |
| 1,350,970 | 8/1920 | Hutchison | 248/346 |
| 1,463,517 | 7/1923 | Mackey | 248/230 |
| 1,684,925 | 9/1928 | Pearlmutter | 248/346 |
| 2,062,156 | 11/1936 | Zerbst | 248/229 |
| 2,313,115 | 3/1943 | Allen | 248/154 |
| 2,765,474 | 10/1956 | Duncan | 248/230 |
| 3,009,676 | 11/1961 | Buchwald | 248/229 |
| 3,193,232 | 7/1965 | Hatcher | 248/311.2 |
| 3,295,811 | 1/1967 | Giwosky | 248/229 |
| 3,380,698 | 4/1968 | Goldberg | 224/30 A |
| 3,568,970 | 3/1971 | Mallett | 248/311.2 |
| 3,598,295 | 8/1971 | Seegers | 248/311.2 |
| 4,071,175 | 1/1978 | Wagnon | 248/225.31 |
| 4,106,737 | 8/1978 | Arnett | 248/310 |
| 4,118,002 | 10/1978 | Bartlett | 248/310 |
| 4,312,465 | 1/1982 | Sinkhorn | 220/85 H |
| 4,570,835 | 2/1986 | Criqui | 224/41 |

FOREIGN PATENT DOCUMENTS

| | | | |
|---|---|---|---|
| 757171 | 12/1933 | France | 248/231.6 |
| 175827 | 3/1922 | United Kingdom | 224/41 |

Primary Examiner—David M. Purol
Assistant Examiner—Robert A. Olson
Attorney, Agent, or Firm—Fulwider, Patton, Rieber, Lee & Utecht

[57] ABSTRACT

A new and improved drink holder for adjustable, detachable and stowable mounting upon a tubular member, the drink holder including an elongated connecting member and an adjustable strap which together define a receiving bore for releasable engagement of the tubular member. A platform, spaced apart from the base member, defines a cavity sized to receive a plurality of detachable retaining arms. The plurality of retaining arms are detachably and pivotally mounted to the platform for radial adjustment for receipt of the container therein.

9 Claims, 1 Drawing Sheet

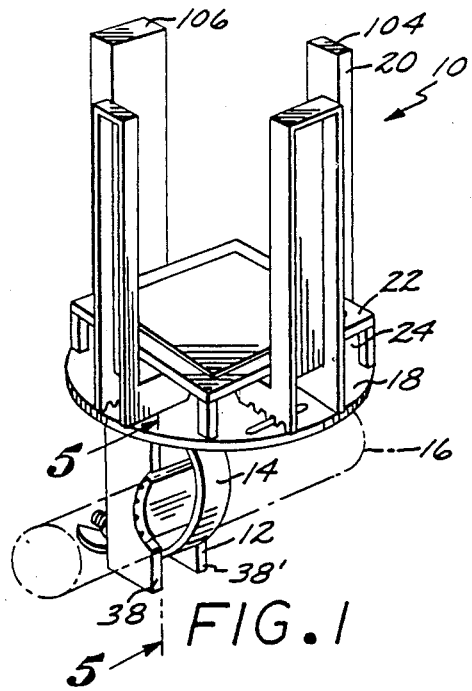
FIG.1
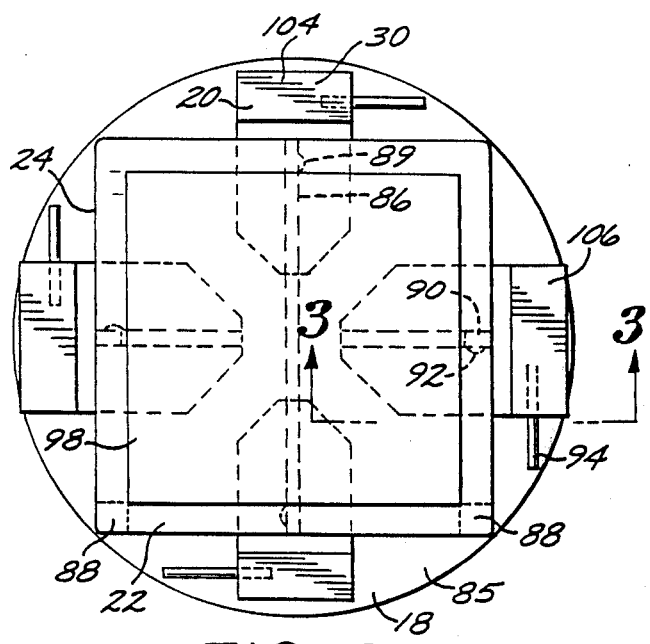
FIG.2
FIG.3
FIG.4
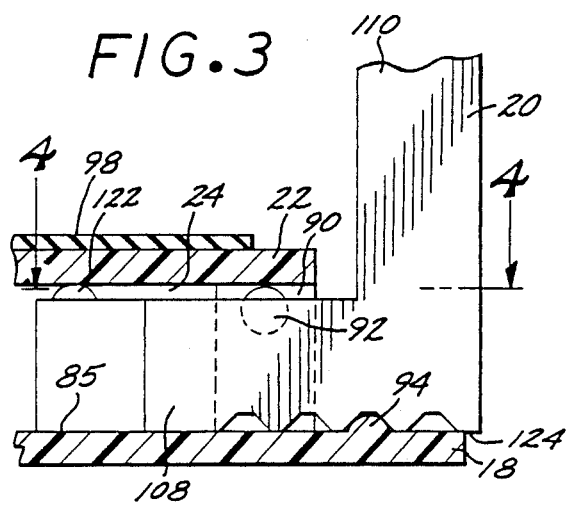
FIG.5
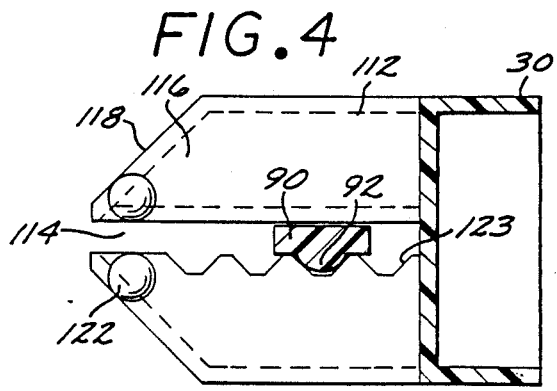
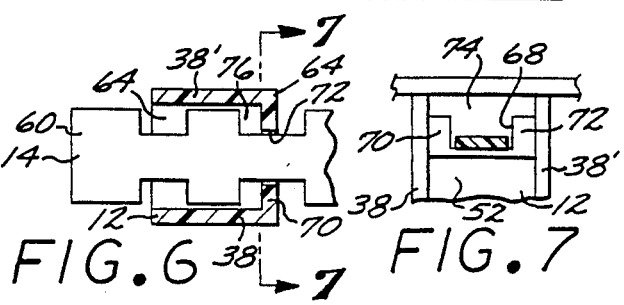
FIG.6  FIG.7
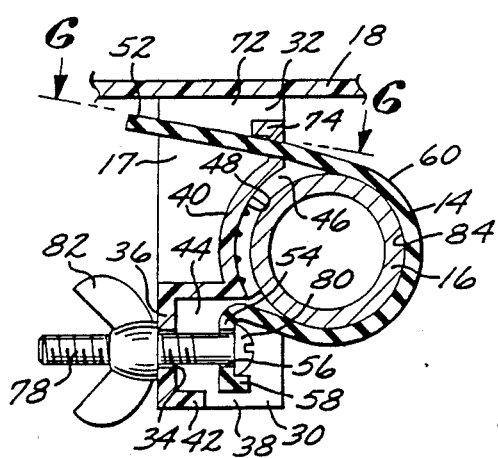
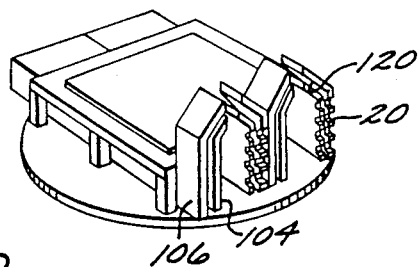
FIG.8

BICYCLE DRINK HOLDER

BACKGROUND OF THE INVENTION

Field of the Invention:

The present invention relates generally to a beverage container holder and, more specifically, to a new and improved beverage container holder for mounting on bicycle handle bars and various types of vehicles using handle bars or exposed tubular frame members.

Description of the Related Art:

Bicycles have long been used as inexpensive modes of transportation. However, safe use of bicycles usually requires the use of both hands in operating or steering the vehicle. Indeed, bicycles often have a brake lever on each handle bar. To free both hands of the operator for operating the vehicle and yet provide easy access to a beverage container, there have been a number of various container carriers or other handle-mounted holding devices; e.g., U.S. Pat. No. 4,570,835, to William D. Criqui, et al., issued Feb. 18, 1986; U.S. Pat. No. 4,312,465, to Herman L. Sinkhorn, et al., issued Jan. 26, 1982; and U.S. Pat. No. 4,071,175 to Van C. Wagnon, issued Jan. 31, 1978. However, none of the above mentioned patents specifically describe or suggest the unique features and combination of structure of the subject container holder as described within this application.

Most of the conventional holders are built for a specific location, e.g., for clamping onto the handle bars of the particular vehicle. However, with some vehicles, as with motorcycles and all-terrain-vehicles ("ATV's"), the vehicle may have a speedometer, tachometer or other instrument mounted upon or in close proximity to the handle bars. As a result, it may be difficult to position the holder where desired because of its structure and configuration.

Another limitation of many drink holders is that they are not easily reduced in size for storage when not in use, and thus an empty drink holder configured according to the prior art is often as bulky and obstructive as one which is in use. Thus, many potential users decide not to use such drink holders for aestaetic or functional reasons, since they do not want a large and obtrusive empty drink holder attached to the vehicle.

Furthermore, some conventional container holders can not be adjusted to hold differently shaped beverage containers. For example, beverages may be contained in cartons, which are generally rectangular in shape, as well as in cans and bottles, which are generally cylindrical in shape. Furthermore, the vehicle operator may want to stow and relocate the holder for various reasons. However, because these conventional drink holder devices generally have a rigid unitary construction, rearrangement into a more compact configuration is difficult or impossible.

Since the conventional drink holder may be affixed to the handle bars, rotation of the holder upon the bar may be impaired. As a result, repositioning to expose reflective surfaces when the drink holder is not in use is impaired. Indeed it may be desirous to simply stow the beverage container holder on the handle bars or also to completely remove the beverage container from the handle bars for relocation to a more unobstructive location.

Thus, those who have been involved in the development of beverage container holders have long recognized the need for an improved bicycle drink holder which provides an adjustable, quickly mountable and easily stowable structure. The present invention fulfills all of these needs.

SUMMARY OF THE INVENTION

Briefly, and in general terms, the present invention provides a new and improved beverage container holder which is adjustable, detachable and stowable.

By way of example, and not necessarily by way of limitation, the drink holder of the present invention provides a new and improved holder for retaining items upon an elongate structural member such as the handle bars of a vehicle. The drink holder includes a mounting for releasably engaging a tubular member. A storage cavity is formed within the mounting. Retaining arms are detachably mounted upon the mounting and are sized to be received within the storage cavity. The basic construction of the invention will incorporate an all plastic injected molded process. This in turn will make for fast, economical production.

In one preferred embodiment, the drink holder of the present invention includes a connecting post and an adjustable strap which, together, define a receiving bore for releasable engagement of handle bars or other tubular vehicle members. Mounted to the connecting post is a base member having a plurality of guide projections extending outward from the base surface opposite from that mounted to the connecting post. A platform is mounted to and spaced apart from the base to define, together with the base, a cavity sized to receive a plurality of detachable retaining arm. Each detachable retaining arm includes a guide slot for receipt of the guide projections for detachable mounting of each arm to the base. A plurality of beads or ridges are positioned upon the base, adjacent the retaining arms, to enable selective radial positioning of the arm relative the base.

From the above description it can be readily seen that the present invention presents a new and useful apparatus for the holding of a wide variety of drink containers while operating a vehicle such as a bicycle and enhancing rider safety with the reflective material when holder is in the stowed position.

Other features and advantages of the present invention will become apparent from the following detailed description, taken into conjunction with the accompanying drawings, which illustrate, by way of example, the principals of the invention.

BRIEF DESCRIPTION OF THE DRAWINGS

FIG. 1 is a perspective drawing of a bicycle drink holder incorporating the novel features of the present invention;

FIG. 2 is an enlarged plan view of the present invention;

FIG. 3 is an enlarged, fragmentary sectional side elevational view taken substantially along the lines 3—3 of FIG. 2;

FIG. 4 is an enlarged, sectional plan view taken substantially along the lines 4—4 of FIG. 3;

FIG. 5 is an enlarged, fragmentary sectional elevational view taken substantially along the lines 5—5 of FIG. 1;

FIG. 6 is an enlarged, fragmentary sectional plan view taken substantially along the lines 6—6 of FIG. 5;

FIG. 7 is an enlarged, fragmentary sectional front elevational view taken substantially along the lines 7—7 of FIG. 6; and FIG. 8 is a fragmentary perspective view of the present invention with the retaining arms in the stowed configuration.

DESCRIPTION OF THE PREFERRED EMBODIMENT

As shown in the exemplary drawings, an improved drink holder constructed in accordance with the present invention is provided for holding a beverage container within easy reach of the vehicle operator during the operation of the vehicle. In addition, the drink holder of the present invention provides for adjustment to the particular shape of the container and is constructed to permit collapsing or rearranging into a more compact, stowable configuration to facilitate storage of the device when not in use. The stowed device can be quickly rotated about the handle bars, so that the device can function as a normal safety reflector.

Referring to FIG. 1, the improved drink holder 10 of the present invention includes a connecting post 12 which cooperates with an adjustable strap 14 to mount upon an elongate member 16, e.g., the handle bars or tubular frame member of the vehicle. A base 18 is mounted upon the connecting post 12. Detachable retaining arms 20 are mounted to the base 18 in an operational or holding position to define a cavity for receipt of the drink container. A platform 22 is mounted upon and spaced apart from the base 18 such that the base and the platform together, define a storage cavity 24 which is sized to receive the plurality of detachable retaining posts 20 when in the stowed position, which is illustrated in FIG. 8 and described below.

Referring to FIG. 2, mounted upon a base surface 85 is a central cross-brace 86 flanked by posts 88. Extending laterally outward adjacent opposite ends of the central cross-brace 86 are projecting beads 89 for receipt and mounting of the retaining arms 20 upon the base 18. A pair of bosses 90, generally orthogonal to the central cross-brace 86, extend outward from a base surface 91. Extending laterally outward from each of the bosses 90 is a second pair of projecting beads 92 for receipt and mounting of the arms 20 to the base 18. Positioned adjacent each of the projecting beads 89 or 92 are locking ridges 94, which extend outward from the surface 85 of the base 18 to cooperate with the retaining arms 20.

FIG. 2 also illustrates support platform 96, mounted upon the cross-brace 86 and the posts 88 and 89. The support platform 96 is spaced apart from and interconnected with the base 18 by the cross-bracing 86 and posts 88 to define, together with the base, a storage cavity 24. The storage cavity 24 is sized to receive the plurality of retaining arms 20 when the arms are detached from their mounting upon the base 18. A pad 98 with a safety reflecting surface may be mounted upon the support platform 96. By this construction, rotation of the improved drink holder about the handle bar, as more fully described elsewhere in this application, orients the safety reflective surface for use as a reflector. In the preferred embodiment, the improved drink holder can be rotated about 90 degrees to the orient reflective surface in a substantially vertical position.

As best shown in FIG. 3, each post 104 and/or 106 is generally L-shaped with a shorter base portion 108 relative to a longer outwardly extending portion 110. The base portion 108, as best shown in FIG. 4, includes two substantially parallel fingers 112 which define a guide slot 114 extending between the adjacent fingers. The distal ends 116 of each finger terminates in an obliquely angled face 118. In the preferred form, the face 118 is angled at about forty-five degrees relative to the guide slot 114. Extending upward and outward from the distal ends 116 are beads 122 and 184 which abut the platform 22 for the selective positioning of the retaining arms 20 relative to the platform when the shorter base portion 108 is inserted between the platform and the base 18. A saw-tooth surface 123 is formed upon an inwardly facing surface within the guide slot 114 for selective radial positioning of the arm 20 relative the center of the platform 22 in place by cooperating with the projecting beads 89 and 92 extending from the cross-bracing 86 and the boss 91.

As shown in FIG. 3, saw-tooth undulations are formed in the bottom surface 124 of the shorter base portion 108 for cooperation with the locking ridges 94 formed on the top surface of the base 18. This construction allows for the adjustment of the retaining post radially outward relative the center of the base 18 for both the size and peripherial configuration of the container to be held by the bicycle drink holder.

While FIG. 4 depicts the interdigitation of the arm 20 with the engaging boss 140, it will be recognized that the small arm 104 interacts with the cross-bracing 86 in a similar manner. In addition, arms 106 will interact with either the boss 91 or the cross-bracing 86 in a similar manner.

As best shown in FIG. 5, the connecting post 12 has a first end 30 and a second end 32. A first bolt bore 34 is formed adjacent the first end 30 through a back wall 36. Side walls 38, a front wall 40 and a bottom wall 42 extend outward from the back wall 36 and are joined along respective edges to define a box-like recess 44 positioned above the first bolt bore 34. The edges of the side walls 38 and an arcuate portion of the front wall 40 together define a mounting recess 46 which extends transversely across the connecting post 12 for receipt of the tubular member 16. For the purposes of illustration, "transverse across the connecting post" is defined as extending from a first side wall 38 to a second side wall 38'.

The arcuate portion of the front wall may be adapted to increase its gripping coefficient. For example, serrations, teeth, or a pad of elastomeric material may be formed or mounted upon the mounting surface 48. The adjustable strap 14 includes a first end 50, and a second end 52. Adjacent the first end 50 is a straight portion 54 defining a first plane. The straight portion 54 has a second bolt bore 56 formed therein corresponding to the first bolt bore 34 formed in the connecting post 12. Extending outward generally perpendicular to the first plane from the planar or straight portion 54 and positioned adjacent the second bolt bore 56 is a retaining wall 58. Extending generally obliquely outward from the first plane is an arcuate portion 60 extending from the first end 50 to the second end 52.

A bolt 78 or other conventional connecting means with a head 80 may be received through the corresponding bolt bores 34 and 56. If a square headed bolt is used, the upwardly retaining wall 58 and/or the upwardly extending walls defining the box-like recess 44. Portions of the side walls 38, front wall 40 and the bottom wall 42 may reduce the rotation of the square head relative to the adjustment strap 14 when in threaded engagement with a wing nut 82. By this construction, the arcuate recess 46 of the connecting post 12 and the arcuate portion 60 of the adjustable strap 14 together define a receiving bore 84 for clamping engagement with the tubular member 16 upon which the bicycle drink holder 10 of the present invention is mounted. In addition, this construction facilitates a quick release of the clamping engagement, allowing rapid rotation of the improved drink holder 10.

The base 18 is mounted upon the connecting post 12 at the second end 32. By this construction, the base 18 cooperates with the connecting post 12 to define, in part, the T-shaped engaging aperture 74 for receipt of the adjustable strap 14. In a preferred form, the base 18 is eccentrically mounted upon the connecting post 12 to project the center of the base radially outward relative to the central longitudinal axis of the connecting post 12. This allows the bicycle drink holder to avoid contact with other items, e.g., a speedometer, tachometer or other instrument, when mounted upon handle bars. Furthermore, the base 18 is mounted upon the connecting post 12 to orient the arcuate recess 46 of the connecting post 12 such that the central longitudinal axis of the recess 46 is substantially parallel to the displacement of the connecting post 12 relative the center of the base 18. While the base 18 is circular in one preferred form, other geometric configurations may be utilized.

As best shown in FIG. 6, extending inward from the top of each of the front wall extensions 70 and 72 is a tab or catch 76 positioned to cooperate with the notches 64 of the adjustable strap 14.

Referring to FIG. 7, the front wall 40 extends from the arcuate recess 52 between first and second side walls 38 and 38' towards the second end 32 of the connecting post 12. A central slot 68 is defined between a first and second extension 70 and 72 of the front wall 40. These extensions 70 and 72 terminate before the top edges of the side walls 38 and 38', to define together, a T-shaped engaging aperture 74.

Referring to FIG. 8, which illustrates the folded configuration of the drink holder, the larger retaining arms 106 are of similar configuration to the small arms 104, except that the larger posts are sized to receive the smaller arm within the hollow interior 130, defined by the outer walls of the larger arms 106. As a result, the smaller arm 104 may be received within the hollow interior of the larger arm 106, which in turn may be inserted within the storage cavity 24 defined between the platform 22 and the base 18. This construction enables the retaining arms 20 to be detached from their mounting to the base 18 and projecting beads 89 and 92 for storage in a more compact or stowable configuration.

In operation, the connecting post 12 and the retaining strap 14 are positioned about the periphery of the tubular member 16 to which the device is to be mounted upon, e.g., the handle bars of the bicycle or motorcycle. The connecting square headed bolt 78 is inserted through the bolt bores 34 and 56. The wing nut 82 is placed in threaded engagement with the bolt 78 to tightly engage the tubular member 16 within the receiving bore 84, i.e., the arcuate recess 46 of the connecting post 12 and the arcuate portion 60 of the adjustable strap 14. The retaining arms 20 are removed from the storage cavity 24 and inserted over the projecting beads 89 and 92 of the base 18 to define portions of a retaining cavity into which the beverage container is placed.

Because the saw-tooth surfaces 123 and 124 will interact with the projecting beads 89 and 91 and the integrated locking ridges 94 on the surface 85 of the base 18, the operator may adjust the positioning of the long portion 110 radially inward or outward from the center of the base.

As a benefit of this construction, the retaining arms 20 can hold a cylindrical item, e.g., a can, or a rectangular structure, e.g., a carton of juice or milk. Furthermore, this construction allows for a quick conversion to a simple reflector device on the handle bars by enabling selective rotation of the improved drink holder about the bar. In addition, this construction allows for easy relocation of the beverage container holder of the present invention to another location on the vehicle by merely releasing the one connecting bolt and detaching and storing the arms in a manner to provide a more compact configuration for storage.

In the presently preferred embodiment, the drink holder is made by using a plastic injection molding process that may not require slides or inserts. This provides for a fast, economical manufacture of the drink holder.

From the above, those skilled in the art will appreciate that the present invention represents a new and useful drink holder for vehicles that embodies many advantages over previously available drink holders. It will also be apparent from the foregoing that, while particular forms of the invention have been illustrated and described, various modifications can be made without departing from the spirit and scope of the invention. Accordingly, it is not intended that the invention be limited, except as by the appended claims.

I claim:

1. A collapsible container holder for use in combination with a cylindrical member, said drink holder comprising:
    a connecting post having a first end and a second end, said connecting post having a mounting recess formed adjacent said first end, said mounting recess sized for receipt of a cylindrical member, and an engaging aperture formed adjacent said second end;
    an adjustable strap mounted to said connecting post, said adjustable strap having a substantially straight portion and an arcuate portion, said arcuate portion having adjustment notches formed therein, said adjustment notches positioned to cooperate with said engaging aperture for releasable restraint of said cylindrical member within a receiving bore defined together by said adjustable strap and said post;
    a base mounted to said second end of said post;
    a platform mounted upon and spaced apart from said base, said platform and base together defining a storage cavity; and
    a plurality of retaining arms selectively mounted to said base for radial adjustment, and retaining arms defining a cavity for receipt of a container and sized to be selectively detached from said base and inserted within said storage cavity, thereby allowing rearrangement of said collapsible container into a compact configuration.

2. A collapsible container holder as set forth in claim 1 further including a reflective surface formed upon said platform.

3. A collapsible container holder as set forth in claim 1, further including at least one boss extending from said base, a plurality of guide beads extending outward from said boss, and a guide slot defined within each said retaining arms for receipt of said guide beads.

4. A collapsible container holder as set forth in claim 3, wherein said retaining arms include a first saw-tooth surface and wherein said base includes a ridge extending outward from said base, said ridge positioned for receipt within said saw-tooth surface for restraining said retaining arms radially outward relative to said base.

5. A collapsible container holder as set forth in claim 4, wherein said arms include a first plurality of arms and a second plurality of arms, said second plurality of arms each defining a hollow interior, said first plurality of arms sized to be received within said hollow interior, said first and said second arms sized to be concurrently inserted within said storage cavity, said first arms and said second arms orthogonally connected to one another.

6. A collapsible container holder for use in combination with a bicycle or motorcycle having a tubular member, said holder comprising:
   a connecting post having a first end, a second end and defining a mounting recess for receipt of a tubular member, said mounting recess having an axis extending laterally across said connecting post and an engaging notch formed in said second end;
   a preformed adjustable strap having a substantially straight portion and an arcuate portion, said straight portion mounted to said connecting post adjacent said first end and said arcuate portion to cooperate with said engaging notch for releasable restraint of said tubular member within said adjustable strap and said post;
   a base eccentrically mounted to said second end of said post;
   a plurality of bosses and guide beads, said bosses extending from said base, said guide beads extending outward from said bosses; and
   a plurality of L-shaped retaining arms, each of said retaining arms including a guide slot for receipt of said bosses within said guide slot, for detachably mounting said retaining arms to said base.

7. A collapsible container holder for use in combination with an elongate member as set forth in claim 6 above, further including a platform mounted upon and spaced apart from said base, wherein said platform and said base together define a storage recess sized to receive said plurality of retaining arms when said fingers are detached from engagement with said base.

8. A collapsible container holder for use in combination with an elongate member as set forth in claim 7 above, further including a reflective surface mounted upon said platform.

9. A collapsible container holder for use in combination with an elongate member as set forth in claim 7 above, further including means for releasably engaging said retaining arms with said base, said means including a plurality of ridges extending outward from said base for cooperating with said retaining arms and providing additional selective restraint with said base.

* * * * *

UNITED STATES PATENT AND TRADEMARK OFFICE
CERTIFICATE OF CORRECTION

PATENT NO. : 4,948,080
DATED : August 14, 1990
INVENTOR(S) : Stephen W. Jack

It is certified that error appears in the above-identified patent and that said Letters Patent is hereby corrected as shown below:

Claim 7, line 18, delete [fingers] and insert therefore arms.

Column 8, line 18 (Claim 7, line 6), delete "fingers" and insert therefore --arms--.

Signed and Sealed this

Third Day of March, 1992

Attest:

HARRY F. MANBECK, JR.

*Attesting Officer*  *Commissioner of Patents and Trademarks*